(12) United States Patent
Tamaizumi et al.

(10) Patent No.: US 7,512,468 B2
(45) Date of Patent: Mar. 31, 2009

(54) ELECTRIC POWER STEERING APPARATUS

(75) Inventors: Terutaka Tamaizumi, Okazaki (JP);
Yuji Kariatsumari, Kashiwara (JP)

(73) Assignees: Favess Co., Ltd., Okazaki-shi (JP);
Koyo Seiko Co., Ltd., Osaka-shi (JP);
Toyoda Koki Kabushiki Kaisha,
Kariya-shi (JP)

( * ) Notice: Subject to any disclaimer, the term of this patent is extended or adjusted under 35 U.S.C. 154(b) by 464 days.

(21) Appl. No.: 11/255,223

(22) Filed: Oct. 19, 2005

(65) Prior Publication Data
US 2006/0085113 A1   Apr. 20, 2006

(30) Foreign Application Priority Data
Oct. 20, 2004   (JP) ............................. 2004-305824

(51) Int. Cl.
*B62D 1/00*   (2006.01)
*B62D 6/00*   (2006.01)
*B62D 5/00*   (2006.01)

(52) U.S. Cl. ........................... 701/41; 701/42; 180/6.2; 180/443

(58) Field of Classification Search ................ 701/41, 701/42; 180/412, 413, 446, 6.2, 443; 475/18, 475/19; 477/1
See application file for complete search history.

(56) References Cited

U.S. PATENT DOCUMENTS 4,989,682 A * 2/1991 Takahashi et al. ........... 180/446
6,913,103 B2 * 7/2005 Kitasaka et al. ............. 180/306
7,009,358 B2 * 3/2006 Tamaizumi et al. ......... 318/632
2003/0164261 A1 * 9/2003 Takahashi .................. 180/443

FOREIGN PATENT DOCUMENTS

| EP | 0800980 | 10/1997 |
|---|---|---|
| EP | 1172278 | 1/2002 |
| EP | 1415891 | 5/2004 |
| JP | 3-189271 | * 8/1991 |

OTHER PUBLICATIONS

JP 3-189271 Translation.*

* cited by examiner

*Primary Examiner*—Thomas G Black
*Assistant Examiner*—Ce Li
(74) *Attorney, Agent, or Firm*—Jordan and Hamburg LLP

(57) ABSTRACT

In an electric power steering apparatus which comprises a motor for generating steering assist force, it is judged whether or not the vehicle is in a state of straight forward motion. A mean reference steering angle is determined by dividing total of relative steering angles which are determined when the vehicle is judged to be in a state of straight forward motion by the number of judgments that the vehicle is in a state of straight forward motion. A steering angle is determined by subtracting a steering angle midpoint from a relative steering angle with taking the mean reference steering angle as the steering angle midpoint. The output of the motor for generating steering assist force is corrected in accordance with an output correction value determined on the basis of the determined steering angle. This output correction value is altered so as to have a positive correlation with the number of judgments that the vehicle is in a state of straight forward motion.

8 Claims, 5 Drawing Sheets

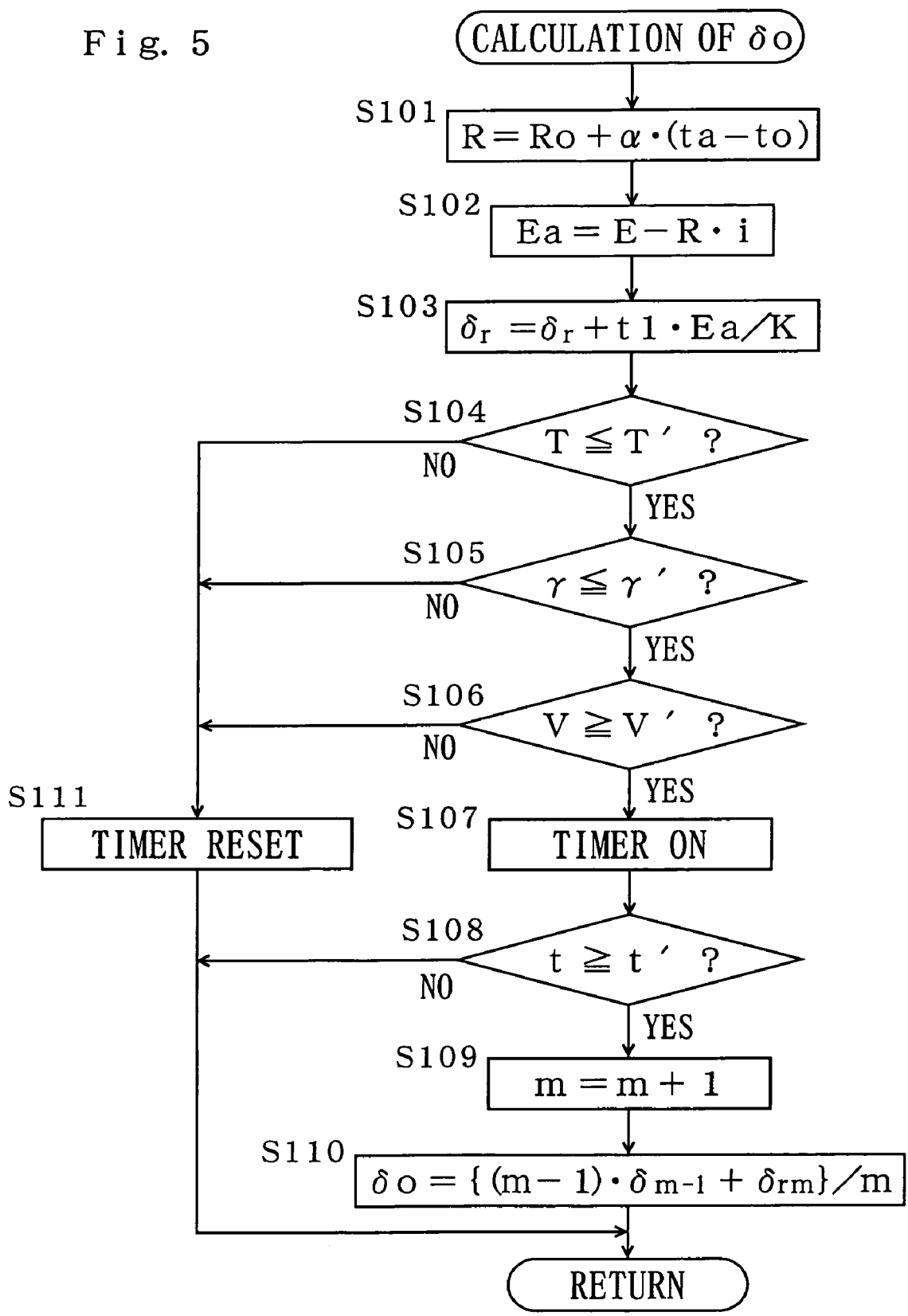

ELECTRIC POWER STEERING APPARATUS

FIELD OF THE INVENTION

The present invention relates to an electric power steering apparatus which provides steering assist force by means of a motor.

DESCRIPTION OF THE RELATED ART

In an electric power steering apparatus equipped with a motor for generating steering assist force, the steering characteristics are improved by correcting the output of this motor in accordance with an output correction value determined on the basis of the steering angle. In this case, if a sensor which detects a value corresponding to the movement of the vehicle wheels is used in order to determine the steering angle, the cost is increased. Accordingly, a method has been proposed in which the counter electromotive force is determined from detection results of the driving current of the motor, the applied voltage to the motor, and the temperature or the like corresponding to the internal resistance in the motor, the relative steering angle is determined on the basis of this counter electromotive force, it is judged whether or not the vehicle is in a state of straight forward motion, and the steering angle is determined wherein the arithmetic mean of the relative steering angles which are determined when the vehicle is in a state of straight forward motion is taken as the midpoint of the steering angle (see Japanese Patent No. 2781854).

SUMMARY OF THE INVENTION

In the abovementioned prior art, since it is difficult to strictly judge whether or not the vehicle is in a state of straight forward motion, the arithmetic mean of the relative steering angles which are determined when the vehicle is judged to be in a state of straight forward motion is taken as the midpoint of the steering angle. However, if the number of judgments is reduced, the precision drops so that accurate control cannot be accomplished; on the other hand, if this number is increased, the initiation of control is delayed. In cases where the steering angle is determined by means of a sensor which detects a value corresponding to the mechanical movement of the vehicle wheels, such a problem also occurs as a result of deterioration in the sensor precision due to lapse of time. It is an object of the present invention to provide an electric power steering apparatus which can solve the problem.

The electric power steering apparatus of the present invention comprises a motor which generates steering assist force, a determining part which determines relative steering angles, a judging part which judges whether or not a vehicle is in a state of straight forward motion, a determining part which determines a mean reference steering angle by dividing total of the relative steering angles which are determined when the vehicle is judged to be in a state of straight forward motion by the number of judgments that the vehicle is in a state of straight forward motion, a determining part which determines a steering angle by subtracting a steering angle midpoint from the relative steering angle with taking the mean reference steering angle as the steering angle midpoint, a correction part which corrects the output of the motor in accordance with an output correction value determined on the basis of the determined steering angle, and an altering part which alters the output correction value so that this value has a positive correlation with the number of judgments that the vehicle is in a state of straight forward motion.

In the present invention, the precision of the mean reference steering angle used as the steering angle midpoint increases with the increase of the number of judgments that the vehicle is in a state of straight forward motion. Accordingly, the precision of the output correction value determined on the basis of the steering angle which is determined with taking the mean reference steering angle as the steering angle midpoint increases with the increase of the number of judgments. By altering the output correction value so that this value has a positive correlation with the number of judgments, it is possible to reduce the amount of output correction of the motor so that precision has no effect and control can be quickly initiated in cases where the number of judgments is small and the precision of the output correction value is low, and it is possible to increase the amount of output correction of the motor so that control can be performed with good precision in cases where the number of judgments is increased and the precision of the output correction value is increased.

In the present invention, it is desirable that the electric power steering apparatus further comprise a sensor which determines steering torque, a controller which controls the motor so that steering assist force corresponding to the determined steering torque is generated, and a judging part which judges whether or not a return steering operation toward the straight forward steering position is being performed, wherein the output correction value has an inverse correlation with the determined steering angle when the return steering operation is being performed. As a result, the magnitude of the output correction value is large as the steering angle is large when the return steering operation is being performed, so that the effect of the steering reaction force which is applied from the road surface via the vehicle wheels can be reduced.

In the electric power steering apparatus of the present invention, the output correction of the motor for generating steering assist force can be quickly initiated and performed with good precision in order to improve the steering characteristics.

BRIEF DESCRIPTION OF THE DRAWINGS

FIG. 5 is a flow chart of the procedure to determine the steering angle midpoint in the electric power steering apparatus of the embodiment of the present invention.

DESCRIPTION OF THE PREFERRED EMBODIMENTS

Figure 1:
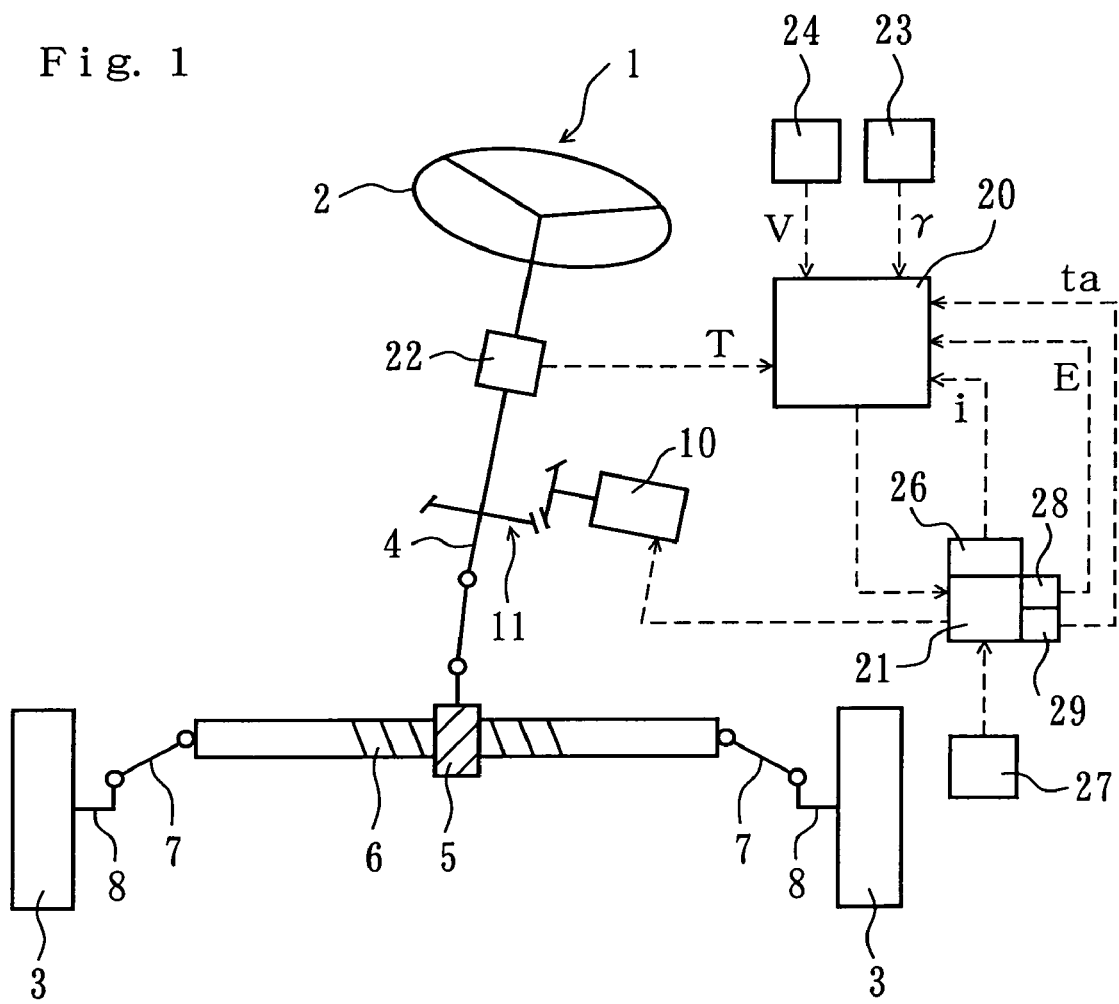
FIG. 1 is a structural explanatory diagram of an electric power steering apparatus of an embodiment of the present invention.

The vehicular electric power steering apparatus 1 constituting an embodiment of the present invention shown in FIG. 1 comprises a mechanism which transmits the rotation of the steering wheel 2 caused by steering operation to the vehicle wheels 3 so that the steering angle varies. In the present embodiment, the rotation of the steering wheel 2 is transmitted to a pinion 5 via a steering shaft 4 so that a rack 6 engaged with the pinion 5 moves, and the movement of this rack 6 is transmitted to the vehicle wheels 3 via tie rods 7 and knuckle arms 8, so that the steering angle varies.

A motor 10 for generating steering assist force which acts on the path via which the rotation of the steering wheel 2 is transmitted to the vehicle wheels 3 is provided. In the present embodiment, the steering assist force is provided by transmitting the rotation of the output shaft of the motor 10 to the steering shaft 4 via a reduction gear mechanism 11.

The motor 10 is connected via a driving circuit 21 to a control device 20 constituted by a computer. The driving circuit 21 controls the power which is supplied to the motor 10 from a battery 27 with PWM control signals from the control device 20. A torque sensor 22 which determines the steering torque T of the steering wheel 2, a yaw rate sensor 23 which determines the yaw rate γ of the vehicle, a vehicle speed sensor 24 which determines the vehicle speed V, a current sensor 26 which determines the driving current i of the motor 10, a voltage detection part 28 which determines the voltage E applied to the motor 10, and a temperature detection part 29 which determines the temperature ta of the motor 10 are connected to the control device 20. The positive and negative signs of the steering torque T, yaw rate γ, driving current i and applied voltage E are set as follows: namely, the signs are positive in cases where the vehicle is caused to turn in either left or right direction, and the signs are negative in cases where the vehicle is caused to turn in the opposite direction. The voltage detection part 28 can be constituted by a circuit which determines the voltage E applied to the motor 10 from the voltage between the terminals of the battery 27 and the PWM duty. The temperature detection part 29 can be constituted by a sensor for detecting temperature of the power transistor constituting the driving circuit 21, and a circuit which determines the temperature of the motor 10 from the relationship between the temperature of the power transistor and the temperature of the motor 10.

The control device 20 controls the motor 10 so that steering assist force is generated in accordance with the basic assist torque corresponding to the determined steering torque T. Furthermore, the control device 20 varies the steering assist force in accordance with the detected vehicle speed V, and corrects the steering assist force in accordance with the steering angle.

Figure 2:
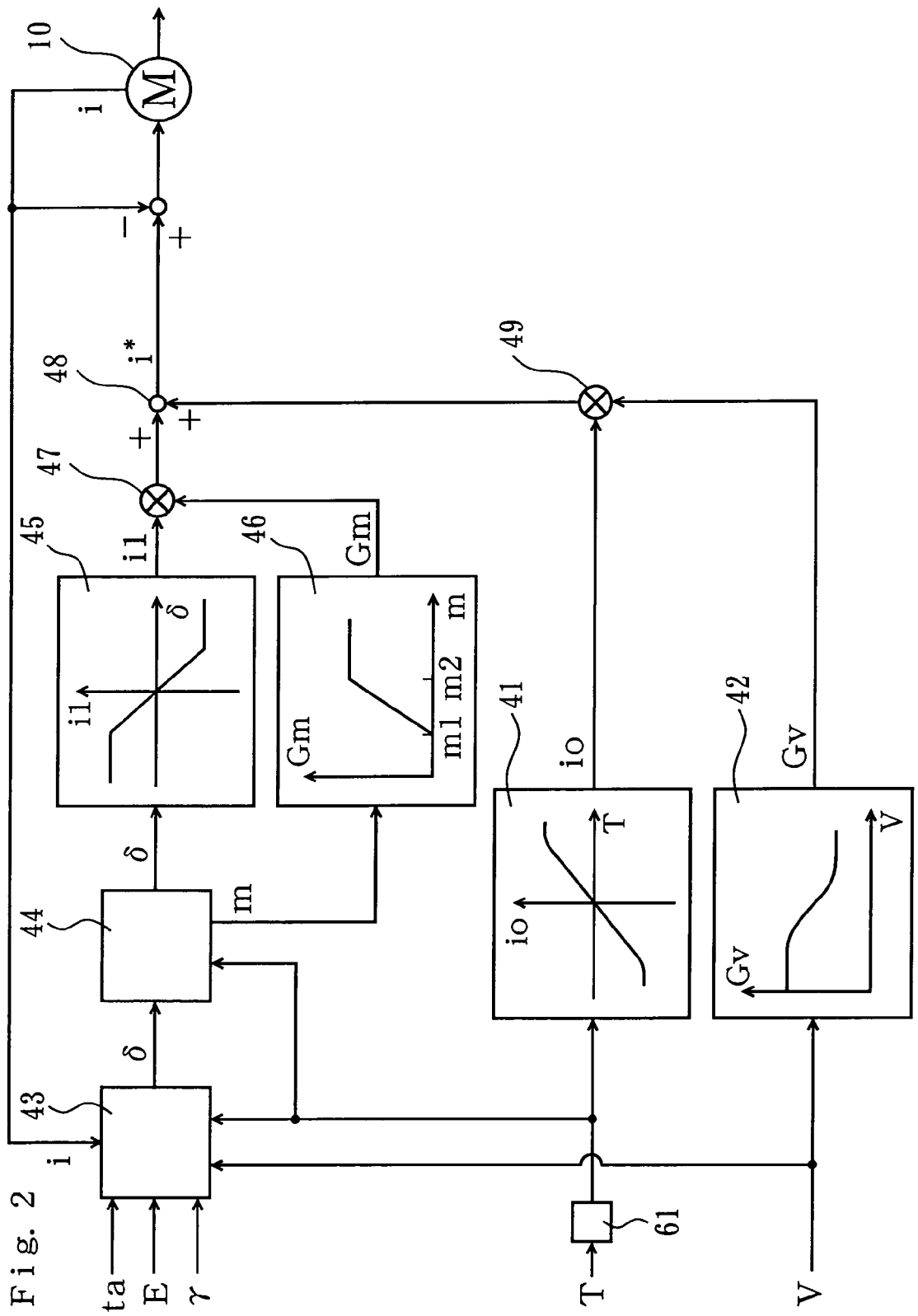
FIG. 2 is a control block diagram of the electric power steering apparatus of the embodiment of the present invention.

FIG. 2 shows a control block diagram for controlling the motor 10 by the control device 20. The output signal of the torque sensor 22 is input into a calculating part 41 via a low-pass filter 61, and is used to determine the basic assist current io. In the calculating part 41, the relationship between the steering torque T and the basic assist current io is stored in the form of, for example, a table or calculation formula, and the basic assist current io corresponding to the detected steering torque T is calculated. As shown for example in the calculating part 41, the relationship between the steering torque T and the basic assist current io is set so that the magnitude of the basic assist current io increases with increase in the magnitude of the steering torque T.

Figure 3:
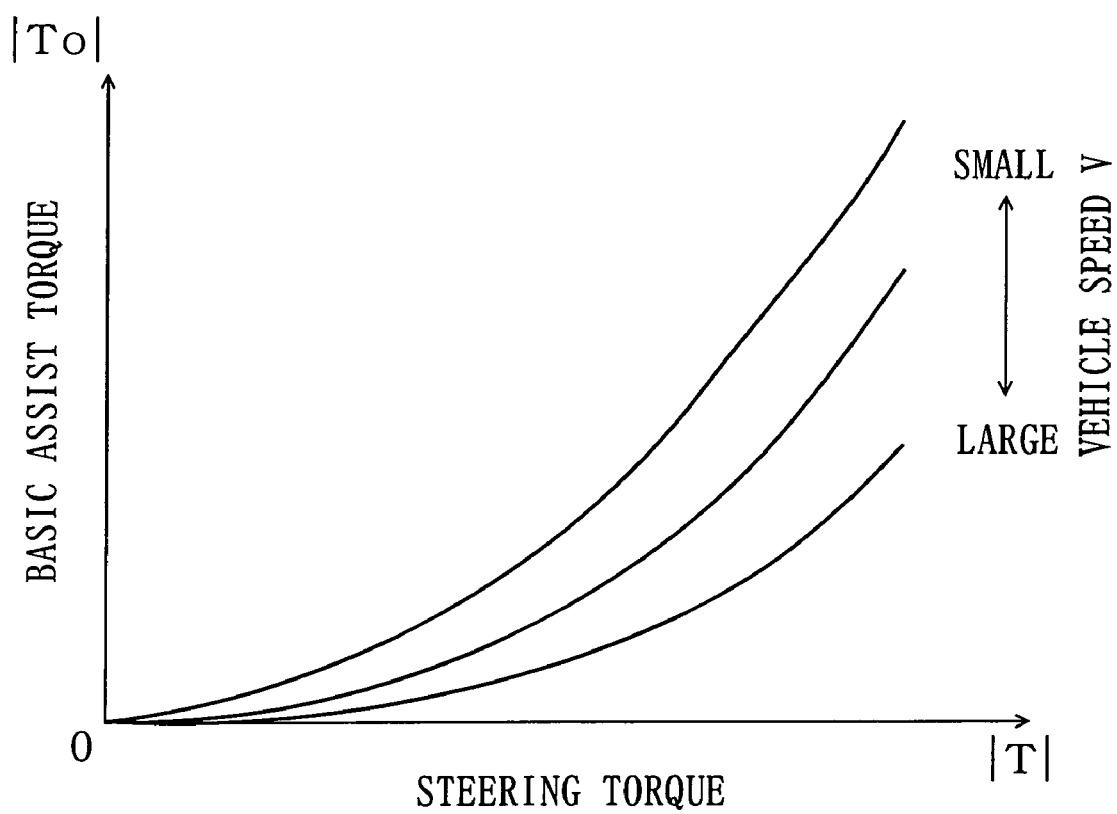
FIG. 3 is a diagram showing the relationship between the steering torque, basic assist torque and vehicle speed in the electric power steering apparatus of the embodiment of the present invention.

In a calculating part 42, the relationship between the vehicle speed V and the basic vehicle speed gain Gv is stored in the form of, for example, a table or calculation formula, and the basic vehicle speed gain Gv corresponding to the determined vehicle speed V is calculated. As shown for example in the calculating part 42, the relationship between the vehicle speed V and the basic vehicle speed gain Gv is set so that the basic vehicle speed gain Gv is larger when the vehicle speed V is low than when the vehicle speed V is high. The product of the basic assist current io and the basic vehicle speed gain Gv corresponds to the basic assist torque. As shown in FIG. 3, if the vehicle speed V is fixed, the magnitude of the basic assist torque To increases up to a set upper limit value as the magnitude of the steering torque T increases, and if the steering torque T is fixed, the magnitude of the basic assist torque To increases as the vehicle speed V decreases. The relationship between the steering torque T and the basic assist current io and the relationship between the vehicle speed V and the basic vehicle speed gain Gv are stored, that is to say, the relationship between the steering torque T and the basic assist torque To is stored.

The steering angle δ is calculated in a calculating part 43. The sign of the steering angle δ is positive in cases where the vehicle is oriented in either left or right direction, and the sign of the steering angle δ is negative in cases where the vehicle is oriented in the opposite direction. In the present embodiment, the internal resistance R of the motor 10 is first determined from the relationship $R=Ro+\alpha \times (ta-to) \times Ro$. Here, ta is the temperature of the motor 10 as detected by the temperature detection part 29, to is a preset reference temperature, Ro is the internal resistance of the motor 10 at the reference temperature to, and α is the resistance temperature coefficient at the reference temperature. Next, the counter electromotive force Ea of the motor 10 is determined from the relationship $Ea=E-R \times i$. The steering angle variation rate ω is determined from the relationship $\omega=Ea/K$, where K is a proportionality constant. Accordingly, where t1 is the cycle of calculation in the control device 20, $\omega_n$ is the steering angle variation rate ω determined in the nth cycle of calculation, and $\delta_{rn}$ is the relative steering angle $\delta_r$ determined in the nth cycle of calculation, the relative steering angle $\delta_r$ is determined at each cycle of calculation from the relationship $\delta_{rn}=\delta_{rn-1}+\omega_n \times t1$. Next, it is judged whether or not the vehicle is in a state of straight forward motion. In the present embodiment, if a state in which the magnitude of the steering torque T is equal to or less than a set value T' because of no substantial steering operation being performed, the magnitude of the yaw rate γ is equal to or less than a set value γ' because of no substantial turning of the vehicle occurring, and the vehicle speed V is equal to or greater than a set value V' because of the vehicle being not stopped continues for a set time t' or longer, then it is judged that the vehicle is in a state of straight forward motion. The relative steering angles $\delta_r$ at any times when the vehicle is judged to be in a state of straight forward motion are taken as the reference steering angles, and a mean reference steering angle is determined by dividing the number of judgments that the vehicle is in a state of straight forward motion into total of the reference steering angles. Where $\delta_{rm}$ is the reference steering angle determined at the time when the mth judgment that the vehicle is in a state of straight forward motion is performed, and $\delta_m$ is the mean reference steering angle determined at the time when the mth judgment that the vehicle is in a state of straight forward motion is performed, the $\delta_m$ is determined from the relationship $\delta_m=\{(m-1)\times \delta_{m-1}+\delta_{rm}\}/m$. Subsequently, with taking the most recent mean reference steering angle as the steering angle midpoint δo, the steering angle δ which is determined by subtracting the steering angle midpoint δo from the relative steering angle $\delta_r$ is determined from the relationship $\delta=\delta_r-\delta o$ at each cycle of calculation.

In a judging part 44, it is judged whether or not return steering operation toward the straight forward steering position is being performed, and in cases where the return steering operation is being performed, the determined steering angle δ is input into a calculating part 45, while in cases where the return steering operation is not being performed, the steering angle δ which is input into the calculating part 45 is set at zero. In regard to this judgment of whether or not the return steering operation is being performed, for example, it is judged that the return steering operation is performed if the positive or negative sign of the steering angle variation ratio does not agree with the positive or negative sign of the detected steering torque T.

In the calculating part 45, a set relationship between the steering angle δ and correction current i1 which is the output correction value for the motor 10 is stored in the form of, for example, a table or calculation formula, and the correction current i1 is calculated on the basis of this stored relationship and the determined steering angle δ. In cases where the return steering operation is not performed, since the steering angle δ which is input into the calculating part 45 is zero, the correction current i1 is zero. In cases where the return steering operation is performed, as shown in the calculating part 45 in FIG. 2, the relationship between the steering angle δ and the correction current i1 is set so that the correction current i1 has an inverse correlation with the steering angle δ.

In a calculating part 46, the relationship between the number m of judgments that the vehicle is in a state of straight forward motion and the midpoint judgment gain Gm is stored in the form of, for example, a table or calculation formula, and the midpoint judgment gain Gm corresponding to the number m of judgment is calculated. The midpoint judgment gain Gm has a positive correlation with the number m of judgments, as shown for example in the calculating part 46 of FIG. 2, this gain is set at zero until the number m of judgments reaches a first set value m1. Subsequently, this gain increases in proportion to the number m of judgments, and is set at a fixed value when the number m of judgments is reached a second set value m2.

In an adding part 48, the control device 20 determines the sum of a value obtained by multiplying the correction current i1 by the midpoint judgment gain Gm in a multiplying part 47 and a value obtained by multiplying the basic assist current io by the basic vehicle speed gain Gv in a multiplying part 49 as the target driving current i* of the motor 10. The steering assist force is provided by controlling the motor 10 with feedback control so that the deviation between the target driving current i* and the determined driving current i is reduced. As a result, the output of the motor 10 is corrected in accordance with the correction current i1 determined on the basis of the determined steering angle δ, and this correction current i1 is altered so as to have a positive correlation with the number m of judgments, furthermore the correction current i1 has an inverse correlation with the steering angle δ when the return steering operation is being performed.

Figure 4:
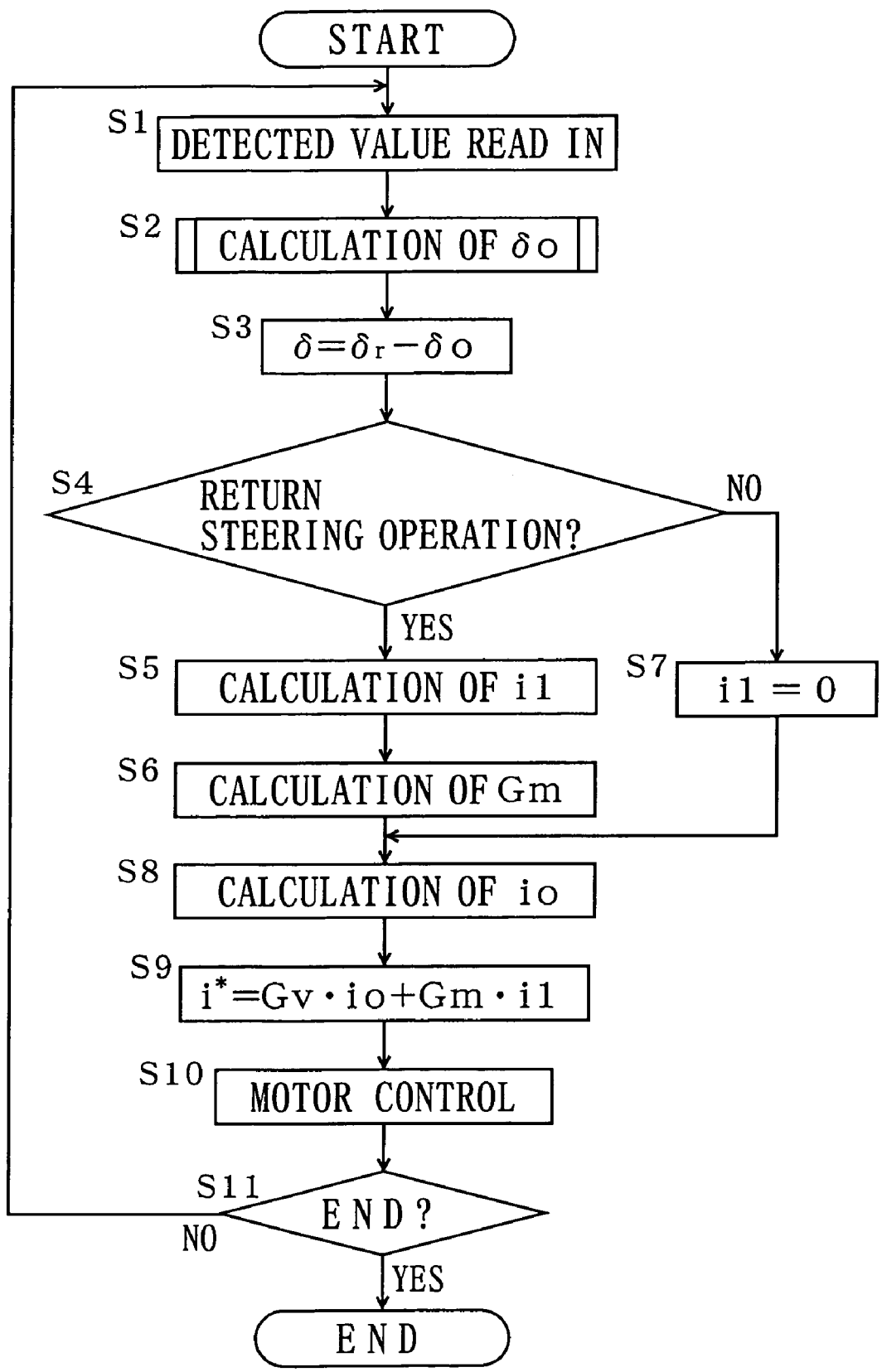
FIG. 4 is a flow chart showing the control procedure in the electric power steering apparatus of the embodiment of the present invention.

The control procedure of the motor 10 by the control device 20 is described with reference to the flow charts shown in FIGS. 4 and 5. First, the detected values detected by the respective sensors are read in (step S1), and the steering angle midpoint δo is calculated (step S2). In the calculation of the steering angle midpoint δo, the internal resistance R of the motor 10 is determined (step S101), the counter electromotive force Ea of the motor 10 is determined (step S102), and the relative steering angle $δ_r$ is determined (step S103). Here, an initial set value can be used as an initial relative steering angle and an initial steering angle midpoint at the time of initiation of control, e.g., this value is set at zero. Next, it is judged whether or not the magnitude of the steering torque T is equal to or less than the set value T' (step S104). If this steering torque T is equal to or less than the set value T' (S104: YES), it is judged whether or not the magnitude of the yaw rate γ is equal to or less than the set value γ' (step S105). If this yaw rate g is equal to or less than the set value γ' (S105: YES), it is judged whether or not the vehicle speed V is equal to or greater than the set value V' (step S106). If the vehicle speed V is equal to or greater than the set value V' (S106: YES), the timer is switched on (step S107), and it is judged whether or not a set time t' or longer has elapsed (step S108). If this set time t' or longer has elapsed (S108: YES), the number m of judgments that the vehicle is in a state of straight forward motion is increased by 1 (step S109); subsequently, the steering angle midpoint δo is determined (step S110), and the processing is returned. In cases where the judgment is negative in any of the step S104, S105 or S106, the timer is reset (step S111), and the processing is returned. In cases where the judgment is negative in step S108 (S108: NO), the processing is returned without resetting the timer. Following the calculation of the steering angle midpoint δo, the steering angle δ is calculated (step S3). Next, it is judged whether or not the return steering operation is being performed (step S4), and in cases where the return steering operation is being performed (S4: YES), the correction current i1 corresponding to the determined steering angle δ is calculated (step S5), and the midpoint judgment gain Gm corresponding to the number m of judgments that the vehicle is in a state of straight forward motion is calculated (step S6). In cases where the return steering operation is not being performed (S4: NO), the correction current i1 is set at zero (step S7). Next, the basic assist current io corresponding to the detected steering torque T is calculated (step S8), the target driving current i*=Gv×io+Gm×i1 is determined (step S9), and the motor 10 is controlled by feedback control so that the deviation between the target driving current i* and the detected driving current i is reduced (step S10). Subsequently, it is judged whether or not control is to be ended according to, for example, whether the ignition switch is on or off (step S11), and in cases where control is not to be ended (S11: NO), the processing returns to step S1.

In the abovementioned embodiment, the precision of the mean reference steering angle used as the steering angle midpoint δo increases with the increase of the number m of judgments that the vehicle is in a state of straight forward motion. Accordingly, the precision of the correction current i1 determined on the basis of the steering angle δ which is determined with taking the mean reference steering angle as the steering angle midpoint δo increases with the increase of the number m of judgments. Since the correction current i1 is altered so as to have a positive correlation with the number m of judgments, it is possible to reduce the amount of output correction of the motor 10 so that the precision has no effect and control can be quickly initiated in cases where the number m of judgments is small and the precision of the correction current i1 is low, and it is also possible to increase the amount of output correction of the motor 10 so that control can be performed with good precision in cases where the number m of judgments increases and the precision of the correction current i1 is increased. Furthermore, the magnitude of the correction current i1 is large as the steering angle δ is large when the return steering operation is being performed, so that the effect of the steering reaction force which is applied from the road surface via the vehicle wheels 3 can be reduced.

The present invention is not limited to the abovementioned embodiment. For example, there are no particular restrictions on the means for judging whether or not the vehicle is in a state of straight forward motion. For instance, the vehicle can be judged to be in a state of straight forward motion if a state in which the magnitude of the steering angle variation rate is equal to or less than a set value because of no substantial steering operation being performed, the magnitude of the lateral acceleration is equal to or less than a set value because of no substantial turning of the vehicle occurring, and the vehicle speed is equal to or greater than a set value because of the vehicle being not stopped continues for a set period of time or longer. Furthermore, the relative steering angle can be determined by an angle sensor instead of being determined by calculation; as a result, the steering angle from the steering angle midpoint can be precisely determined even if the precision of the angle sensor is deteriorated due to lapse of time and others. Furthermore, the output correction value of the motor is not limited to the value which is determined on the basis of the steering angle alone, for example, this value can vary in accordance with the steering angle variation rate, steering angle variation acceleration or the like so that the effects of inertia of the motor and disturbance can be compensated for. The mechanism which transmits the rotation of the steering wheel to the vehicle wheels so that the steering angle varies is not limited to the abovementioned embodiment; this can also be a system which transmits the rotation of the steering wheel to the vehicle wheels via the steering shaft and a link mechanism other than the rack and pinion mechanism. Furthermore, as long as the mechanism which transmits the output of the motor for generating steering assist force to the steering system is capable of providing steering assist force, this mechanism is not limited to the abovementioned embodiment; for example, the steering assist force can also be provided by driving a ball nut screwed onto a ball screw integrated with the rack by means of the output of the motor.

What is claimed is:

1. An electric power steering apparatus comprising:
    a motor which generates a steering assist force;
    a steering angle determining part which determines measurement based steering angles based on concurrently measured values;
    a straight travel judging part which judges whether or not a vehicle is in a state of straight forward motion;
    a mean reference angle determining part which determines a mean reference steering angle by dividing total of said measurement based steering angles, which are determined when the vehicle is judged to be in a state of straight forward motion, by a number m of judgments that the vehicle is in a state of straight forward motion which is a number of said measurement based steering angles which are totaled;
    a corrected steering angle determining part which determines a corrected steering angle by subtracting a steering angle midpoint from a presently determined measurement based steering angle wherein said mean reference steering angle is used as said steering angle midpoint;
    a steering angle based correction part which corrects an output of said motor in accordance with a steering angle output correction value determined on a basis of the corrected steering angle; and
    a gain application part applying said steering angle output correction value to correct the output of said motor wherein an absolute amount of said steering angle output correction value applied for a given corrected steering angle is increased as the number m of said measurement based steering angles which are totaled to determine said mean reference steering angle increase.

2. The electric power steering apparatus according to claim 1, further comprising:
    a sensor which determines steering torque;
    a controller which controls said motor so that the steering assist force generated corresponds to the determined steering torque; and
    a return steering judging part which judges whether or not a return steering operation toward a straight forward steering position is being performed;
    wherein said output correction value has an inverse correlation with the corrected steering angle when the return steering operation is being performed.

3. The electric power steering apparatus according to claim 1, wherein said gain application part has gain determined by a gain characteristic applied to said steering angle output correction value which linearly increases the gain as said number m increases from a first predetermined value to a second predetermined value, and said gain is applied to multiply said steering angle output correction value.

4. The electric power steering apparatus according to claim 3, wherein said gain application part has said gain characteristic configured such that said gain applied to said steering angle output correction value is zero for values of said number m less than said first predetermined value.

5. The electric power steering apparatus according to claim 4, wherein said gain application part has said gain characteristic configured such that said gain applied to said steering angle output correction value is a constant for values of said number m greater than said second predetermined value.

6. The electric power steering apparatus according to claim 1, wherein said gain application part has a gain characteristic configured such that a gain applied to said steering angle output correction value is zero for values of said number m less than a first predetermined value, and said gain is applied to multiply said steering angle output correction value.

7. The electric power steering apparatus according to claim 6, wherein said gain application part has said gain characteristic configured such that said gain applied to said steering angle output correction value is a constant for values of said number m greater than a second predetermined value.

8. The electric power steering apparatus according to claim 1, wherein said gain application part has said gain characteristic configured such that a gain applied to said steering angle output correction value is a constant for values of said number m greater than a second predetermined value, and said gain is applied to multiply said steering angle output correction value.

* * * * *